(12) United States Patent
Hatta

(10) Patent No.: US 7,090,059 B2
(45) Date of Patent: Aug. 15, 2006

(54) POWERED SLIDE RAIL DEVICE FOR VEHICLE SEAT

(75) Inventor: Susumu Hatta, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 10/841,453

(22) Filed: May 10, 2004

(65) Prior Publication Data

US 2005/0247232 A1 Nov. 10, 2005

(51) Int. Cl.
*B60L 5/38* (2006.01)
*E01B 25/22* (2006.01)
*A47C 7/62* (2006.01)

(52) U.S. Cl. .................. 191/22 R; 104/106; 297/217.1
(58) Field of Classification Search ................ 104/106, 104/107, 108, 287, 288; 191/22 R, 23 R; 297/217.1, 217.3
See application file for complete search history.

(56) References Cited

FOREIGN PATENT DOCUMENTS

| JP | 08-332906 | | 12/1996 |
|---|---|---|---|
| JP | 2002-326527 | * | 11/2002 |
| JP | 2005-47380 | * | 7/2003 |

* cited by examiner

*Primary Examiner*—S. Joseph Morano
*Assistant Examiner*—Robert J. McCarry, Jr.
(74) *Attorney, Agent, or Firm*—Browdy and Neimark, PLLC

(57) ABSTRACT

A powered slide rail device including an electrode element extending along the lower rail thereof and a contact brush element provided in the upper runner rail element thereof which is slidably engaged with the lower rail. The electrode element is so arranged as to provide a sloped surface. The contact brush element, with which an output connector is electrically connected, projects from the upper runner rail element and contacts such sloped surface of electrode element. A biasing element may be provided to retain the contact brush element in contact with the sloped surface of electrode element.

4 Claims, 2 Drawing Sheets

POWERED SLIDE RAIL DEVICE FOR VEHICLE SEAT

BACKGROUND OF THE INVENTION.

1. Field of the Invention

The present invention relates to a powered slide rail device for adjustably moving a vehicle seat in forward and backward directions under the drive force of an electric motor and associated electric element.

2. Description of Prior Art

FIG. 1 shows a conventional powered slide rail device (102) on which a front seat (100) and a rear seat (101) are slidably mounted. This kind of slide rail device is frequently used in a vehicle having a long and wide cabin, such as a minivan, and typically comprised of a long lower rail, an upper rail slildably engaged with the long lower rail, a lead screw disposed in and along the long lower rail in the longitudinal direction thereof, a nut member rotatably disposed in the upper rail, the nut member being threadedly engaged about a part of such long lead screw, and a motor connected with the nut member. Normal and reverse operation of the motor causes forward and backward movement of the upper rail along the lower rail to adjustingly position a seat on the slide rail device at a desired point.

In most cases, such powered slide rail device is one mechanical part of a powered vehicle seat which includes a plurality of electric motors associated with a seat cushion tip-up mechanism, reclining device and so forth. Hence, as shown in FIG. 1, a long electric cable (103), which is electrically connected between the seat and a power source, extends along the long lower rail or a floor of vehicle, so that the seat can smoothly move on and along the long lower rail.

But, the long electric cable stands in the way of a passenger who sits on the seat, or narrows the floor area on which the passenger can rest his or her feet. It is therefore frequently the case that the wire cable is cut off by the passenger's feet, or partly broken to cause a short circuit therein.

Solution to such problem has been found for example in the Japanese Laid-Open Patent Publication No. 8-332906 which discloses a powered slide rail device wherein an electrode plate, electrically connected with a power supply, is fixed to and along the inner wall of a lower rail of the slide rail device, and a contact brush, electrically connected with a motor, is provided on an upper rail slidably engaged with the lower rail. The contact brush is kept in contact with the electrode plate, so that an electric current flows from the power supply side (e.g. an electric connector for powered seat, which is provided on a control box) to the motor. With that structure, the electric current path is not exposed outwardly like the afore-said electric cable.

Nonetheless, in the foregoing prior art, the electrode plate extending along the lower rail inner wall is perpendicular with the flat plane of floor, and the contact brush is provided on a movable connector so as to project horizontally and slidably contact such perpendicular electrode plate. This conventional arrangement is found defective in that a slidable contact between the contact brush and electrode plate is not complete, and thus, it is highly possible that a loose connection will occur between those contact brush and electrode plate due to a vibration of a vehicle body or a deformation of the upper and lower rails in a collision case or the like.

SUMMARY OF THE INVENTION

In view of the above-stated drawbacks, it is a purpose of the present invention to provide an improved powered slide rail device which insures a constant contact between contact brush element(s) and electrode element(s).

In order to achieve such purpose, a powered slide rail device in accordance with the present invention is basically comprised of:
- a lower rail means for fixation to a floor of vehicle;
- an upper runner rail means slidably engaged with the lower rail, such that the upper runner means is slidingly movable along the lower rail;
- an electrode means provided in the lower rail so as to extend therealong, the electrode means being so arranged as to provide a sloped surface;
- a contact brush means provided in the upper runner rail means so as to project therefrom and contact the sloped surface of the electrode means; and
- an output connector electrically connected with the contact brush means.

Preferably, a biasing means is provided for resiliently biasing the contact brush means toward the electrode means, so that the contact brush means is retained in contact with the sloped surface of the electrode means.

Other various features and advantages will become apparent from reading of the description hereinafter, with reference to the annexed drawings.

DETAILED DESCRIPTION OF PREFERRED EMBODIMENT OF THE INVENTION

Figure 1:
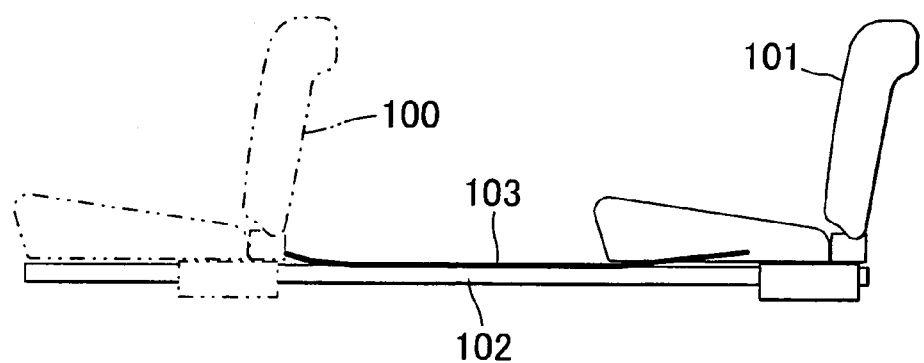
FIG. 1 is an a diagram showing a conventional powered slide rail device.
Figure 2:
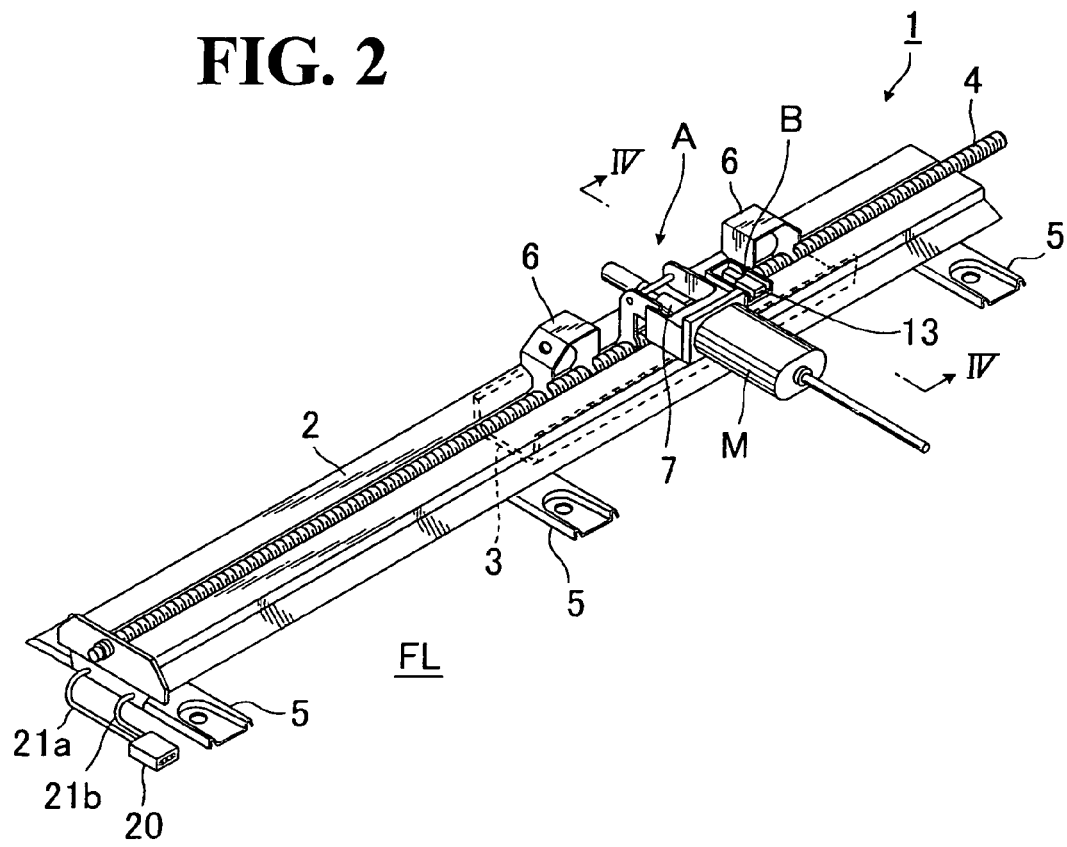
FIG. 2 is a partly broken schematic perspective view of a powered slide rail device in accordance with the present invention.
Figure 3:
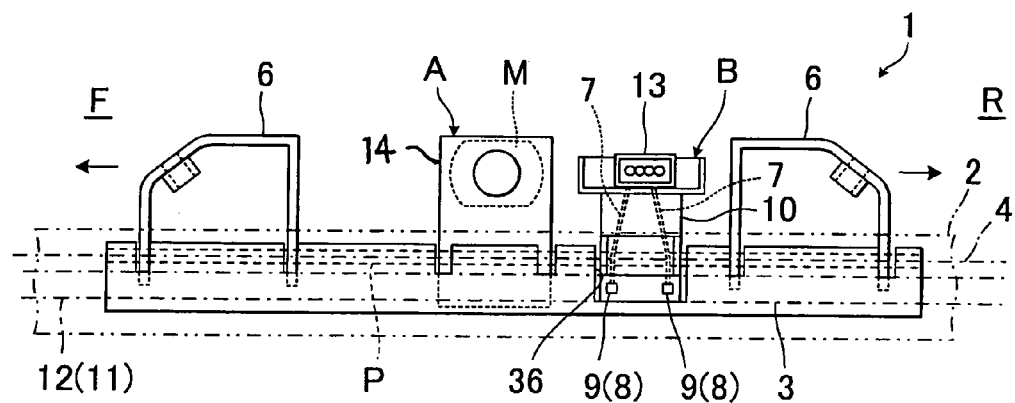
FIG. 3 is a side view showing an upper runner rail element and principal part of the present invention.
Figure 4:
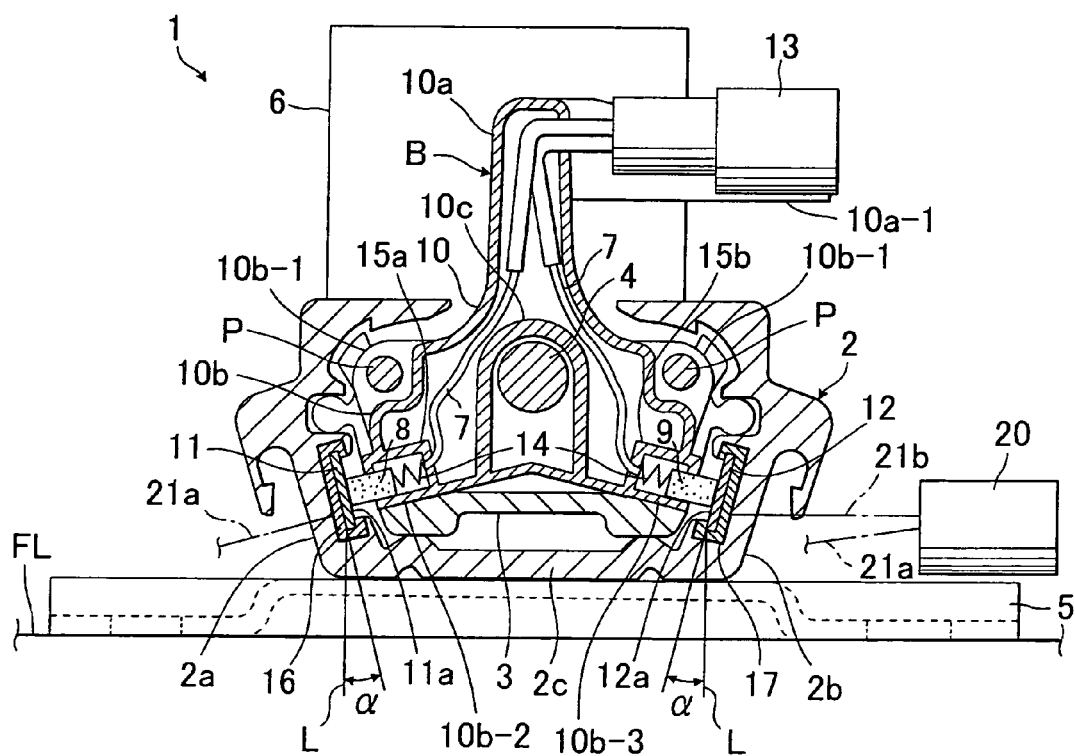
FIG. 4 is a sectional view taken along the line IV—IV of the FIG. 2.

Referring to FIGS. 2 to 4, there is illustrated a preferred mode of powered slide rail device (1) in accordance with the present invention.

As is known generally, while not shown, the powered slide rail device of this kind is operatively connected between a floor of vehicle and a powered vehicle seat, and has an electric motor (at M) as a driving force to move the associated rail element so as to adjustably move the vehicle seat forwardly and backwardly through operation of a control switch provided on a lateral side of the powered vehicle seat.

FIG. 2 shows, in perspective, an exemplary mode of powered slide rail device (1) in the present invention. The powered slide rail device (1) is formed by a stationary lower rail (2) and a runner rail element (3) slidably disposed within the lower rail (2), so that the latter (3) is slidably movable in and along the former (2) in forward and backward directions (see the arrows and designations (F) and (R) in FIG. 3, wherein the designation (F) refers to a side forwardly of the slide rail device (1) and the designation (R) refers to a side backwardly of the slide rail device (1).) Both stationary lower rail (2) and runner rail element (3) are formed from a rigid metallic material as normally known in the art.

The stationary lower rail (2) has securing brackets (5) and is fixedly fastened via the securing brackets upon a vehicle floor (FL). The illustrated slide rail device (1) is of a long slide rail type wherein the stationary lower rail (2) is long and suited for installation in a relatively large vehicle such as a minivan.

As can be seen in FIG. 2, as known in the art, a lead screw (4) is provided centrally in the stationary lower rail (2) so as to extend in a longitudinal direction therealong. Designation (A) denotes a drive mechanism which is basically comprised of an electric motor (M) and a worm screw (7) fixed to a driving shaft of the motor (M), wherein the motor (M) is coupled via a bracket (14) with the runner rail element (3) (as shown in FIG. 3). This drive mechanism (A) is also known in the art and not the subject matter of the present invention. Briefly stated, the worm screw (7) is threadedly engaged on a part of the lead screw (4), and normal and reverse operation of the motor (M) causes like wise corresponding rotation of the worm screw (7), whereby the runner rail element (3) is moved in the forward and backward directions.

As shown, a pair of connecting brackets (6) (6) are integrally coupled with the runner rail element (3) and disposed above the lead screw (4). Though not shown, a seat is fixedly mounted on those two connecting brackets (6).

As shown in FIG. 3, the drive mechanism (A) and a brush assembly (B) are disposed on the runner rail element (3) at a point between the two connecting brackets (6).

In accordance with the present invention, as seen from FIGS. 3 and 4, the stationary lower rail (2) is provided with a pair of first and second electrode plates (11) (12) in the respective two lateral walls (2a) (2b) thereof, such that the two electrode plates (11) (12) are each in an inclined manner relative to a vertical line perpendicular with the horizontal or flat surface of the floor (FL). As indicated in FIG. 4, electrically connected with such first and second electrode plates (11) (12) are a pair of electric cables (21a) (21b) of input connector (20), respectively, wherein the input connector (20) may be electrically connected with a power supply source or a battery (not shown).

Specifically, with particular reference to FIG. 4, the illustrated stationary lower rail (2) of generally "U" shaped cross-section has a pair of upwardly extending inclined first and second lateral walls (2a) (2b) and a horizontal bottom wall (2c). As shown, those first and second lateral walls (2a) (2b) extend in a divergent way upwardly from the horizontal bottom (2c), so that the two lateral walls (2a) (2b) extend aslant outwardly away from each other as they proceed upwards to the upper end of the lower rail (2).

In those first and second lateral walls (2a) (2b) of lower rail (2), are respectively fixed the pair of first and second electrode plates (11) (12) which, as seen in FIG. 3, extend in the longitudinal direction thereof. As best shown in FIG. 4, the first electrode plate (11) is securely attached, via an insulation securing member (16), in the inner sloped surface of the first lateral wall (2a), whereas on the other hand, the second electrode plate (12) is securely attached, via an insulation securing member (17), in the inner sloped surface of the second lateral wall (2b). Accordingly, it is seen that the first and second electrode plates (11) (12), which extend longitudinally along the long lower rail (2), are inclined outwardly from a vertical line (L) at a certain angle ($\alpha$) (about 20 degrees, for instance), the vertical line (L) being perpendicular with the horizontal surface of the floor (FL), whereupon the first and second electrode plates (11) (12) provide their respective upwardly sloped electrode surfaces (11a) (12a). In other words, those electrode surfaces (11a) (12a) extend divergently in upward direction from the floor (FL).

It is noted here that, of course, the first and second lateral walls (2a) (2b) of lower rail (2) are not limited to the inclined state shown in FIG. 4, but they may be vertical or perpendicular with the horizontal plane of the floor (FL), in which case, the first and second electrode plates (11) (12) should each be firmly attached in the vertical inner surface of each of the first and second lateral walls (2a) (2b) in the same inclined manner as described above at the certain angle ($\alpha$) (about 20 degrees, for instance).

The brush assembly (B) is comprised of a frame (10), an output connector (13) securely mounted on the frame (10), and first and second contact brush elements (8) (9). The output connector (13) has lead wires (7). While not shown, this output connector (13) is to be electrically connected with the motor (M) and also may be electrically connected with other electric and electronic elements, such as electric drive elements provided in a seat cushion tip-up mechanism and a reclining mechanism used in a seat.

As seen from both FIGS. 3 and 4, the frame (10) of the brush assembly (B) is at the lower portion thereof fixedly mounted in a securing cut-out region (36) of the runner rail element (3). The frame (10) per se is so formed to have: an upwardly extending support portion (10a) having a securing bracket (10a-1) on which the output connector (13) is securely mounted; and a lower base portion (10b) having a pair of securing portions (10b-1) (10b-1) which are respectively connected with a pair of securing pins (P) (P) fixedly provided in the runner rail element (3).

The lower base portion (10b) of the brush assembly frame (10) includes a pair of downwardly inclined first and second bottom regions (10b-2) (10b-3) extending aslant downwardly from the center thereof, and a pair of first and second brush holder regions (15a) (15b) which are defined integrally on such two downwardly inclined bottom regions (10b-2) (10b-3), respectively. The first and second bottom regions (10b-2) (10b-3) are integrally connected with each other and reinforced by a reinforcing tunnel region (10c) of generally inverted-U-shaped cross-section through which the lead screw (4) extends. It is observed that each of the first and second brush holder regions (15a) (15b) opens in the lower portion of the lateral wall of the lower base portion (10b) at a point facing to the corresponding one of the first and second electrode plates (11) (12).

In the FIG. 4, the first and second brush elements (8) (9) are depicted to be accommodated in the respective first and second brush holder regions (15a) (15b). Each of the first and second brush elements (8) (9) is biased by a spring (14) in a direction outwardly of the frame (10) so as to resiliently project a part of its body outwardly from the corresponding brush holder region (15a or 15b). The spring (14) per se is of an electrically conductive property and connected with the afore-said lead wire (7) of output connector (13), as shown, so that electric current and signal can flow between the brushes (8, 9) and the output connector (13).

With this arrangement, the first and second brush elements (8) (9) are kept in contact with the respective first and second electrode plates (11) (12) in downwardly inclined manner, so that an electric current stably and constantly flows between the brush elements (8, 9) and the electrode plates (11, 12).

From comparative view of FIGS. 3 and 4, it is to be seen that a pair of the first brush elements (8) (8) are provided to one lateral side (i.e. right side) of the frame lower base portion (10b) and biased to contact with the first electrode plate (11), while a pair of the second brush elements (9) (9) are provided to another lateral side (i.e. left side) of the frame lower base portion (10b) and biased to contact with the second electrode plates (12). Accordingly, while the runner rail element (3) or the seat (not shown) is moved forwardly and backwardly, an electric current continues to be applied to the motor (M) and other elements via the brush elements (8, 9) which are kept in a sliding contact with the electrode plates (11, 12).

It is therefore appreciated that, in accordance with the present invention, the following effects and advantages are obtained:

(i) The fact that both contact brush elements (8, 9) and electrode plates (11, 12) are inclined as described above insures a constant electrical contact therebetween, irrespective of whether both lower rail (2) and runner rail element (3) may be subjected to vertical and lateral vibrations during run of vehicle on a rough road, and irrespective of whether those rail elements (2, 3) may be deformed by a great load applied thereto in a collision case and the like, or have been deformed out of a predetermined size during the steps of forming or molding them. Moreover, the sloped surfaces (11a) (12a) of the electrode plates (11, 12) effectively facilitate the ease with which abraded particles of the contact brush elements (8, 9) are fallen downwardly therealong.

(ii) As can be seen in FIG. 4, the electrode plates (11) (12) provide their respective wide surfaces (11a) (12a) with respect to the contact brush elements (8, 9) so as to absorb vertical displacement of the contact brush elements (8, 9) which occurs due to a vertical vibration or the like, thereby insuring to prevent undesired dislocation and disconnection of the contact brush elements (8, 9) from the electrode plates (11, 12). Of course, the area of each of the electrode plate surfaces (11a, 12a) may be increased as desired.

While having described the present invention as above, it should be understood that the invention is not limited to the illustrated embodiment, but any other modification, replacement and addition may be applied thereto without departing from the scopes of the appended claims. For example, each of the first and second electrode plates (11) (12), which extends longitudinally along the long lower rail (2), may be inclined from the vertical line (L) at the same certain angle (α), such that their respective sloped electrode surfaces (11a) (12a) extend divergently in downward direction to the floor (FL), in contrast to the embodiment shown in FIG. 4.

The invention claimed is:

1. A powered slide rail device in combination with a floor of vehicle, comprising:
a lower rail means for fixation to said floor of vehicle, said lower rail means having at least one lateral wall and a horizontally bottom wall;
an upper runner rail means slidably engaged with said lower rail, such that said upper runner means is slidably movable along said lower rail;
at least one electrode plate having a longitudinally extending body with a flat surface, said at least one electrode plate being provided in said lower rail means such that a transverse width thereof extends upward from said bottom wall of the lower rail means and said longitudinally extending body thereof extends along said at least one lateral wall of said lower rail means in a parallel relation therewith;
a biasing means;
a contact brush means being provided in said upper runner rail means, said contact brush means being resiliently biased by said biasing means to a slidable contact with said flat surface of at least one electrode plate in a direction orthogonal therewith;
wherein said transverse width of said at least one electrode plate is larger than the surface of said contact brush means contacting said at least one electrode plate, and
an output connector electrically connected with said contact brush means.

2. The powered slide rail device according to claim 1, wherein said contact brush means comprises a plurality of contact brush elements.

3. A powered slide rail device in combination with a floor of vehicle, comprising:
a lower rail means for fixation to said floor of vehicle;
an upper runner rail means slidably engaged with said lower rail, such that said upper runner means is slidingly movable along said lower rail means;
at least one electrode plate having a flat surface, said at least one electrode plate being provided in said lower rail means so as to extend therealong, while being inclined to provide a sloped flat surface in relation to a line perpendicular with said floor of vehicle;
a biasing means;
at least one contact brush element provided in said upper runner rail means, said at least one contact brush element being resiliently biased by said biasing means toward said at least one electrode plate, so that said at least one contact brush element is retained in a slidable contact with said sloped flat surface of said at least one electrode plate; and
an output connector electrically connected with said contact brush means.

4. A powered slide rail device in combination with a floor of vehicle, comprising:
a lower rail for fixation to said floor of vehicle, said lower rail having two lateral walls;
an upper runner rail slidably engaged with said lower rail, such that said upper runner rail is slidably movable along said lower rail;
a pair of electrode plates which are respectively provided on said two lateral walls of said lower rail so as to extend therealong, said pair of electrode plates being each inclined at a predetermined angle from a line perpendicular with said floor of vehicle to provide a sloped surface;
a biasing means;
a plurality of contact brush elements provided in said upper runner rail, said plurality of contact brush elements being resiliently biased by said biasing means toward said pair of electrode plates, so that said pair of contact brush elements are each retained in a slidable contact with said sloped flat surface of each of said pair of electrode plates; and
an output connector electrically connected with said plurality of contact brush means.

* * * * *